Patented Nov. 9, 1926.

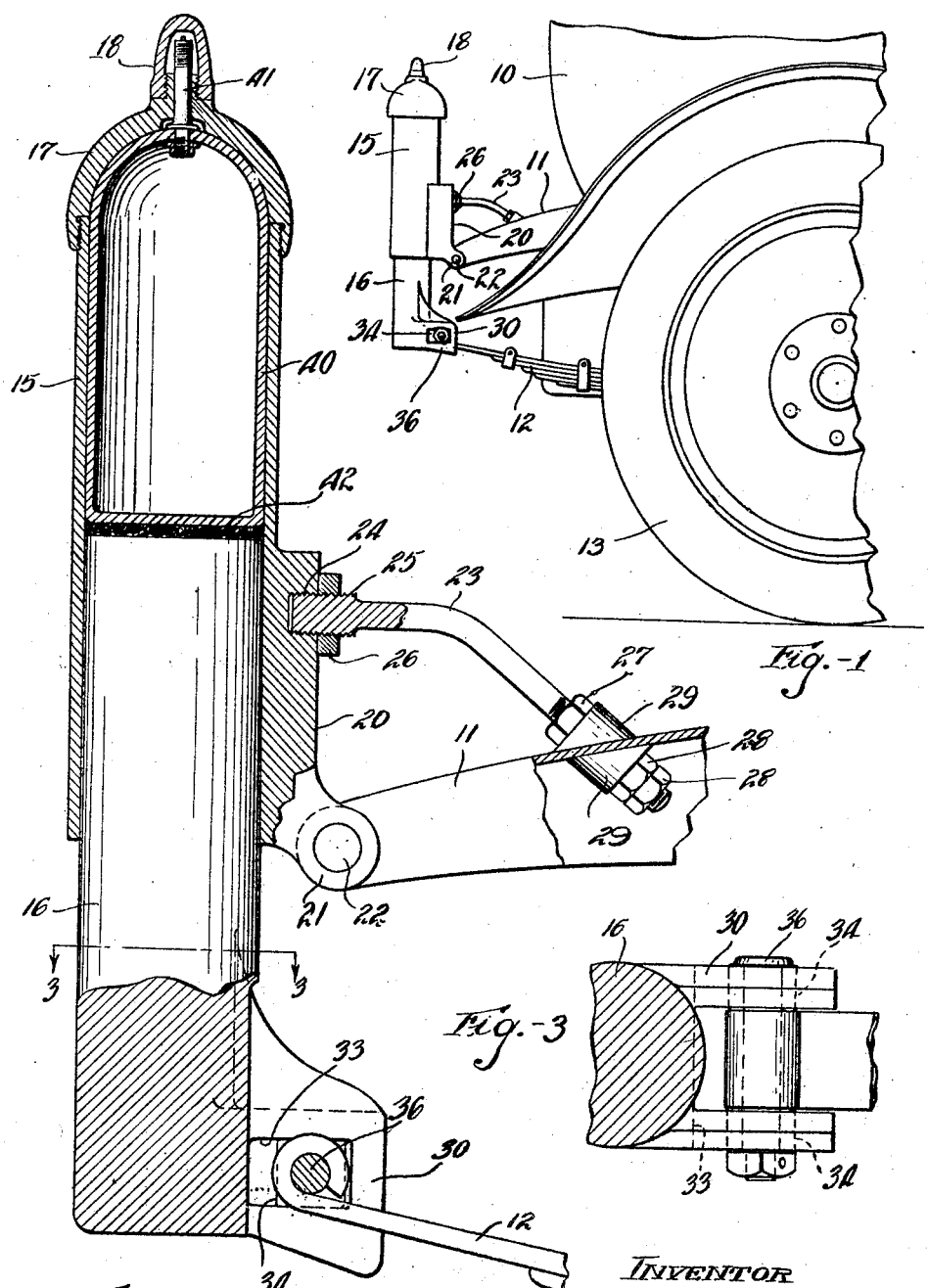

1,606,575

UNITED STATES PATENT OFFICE.

JOSEPH HOFFMAN, OF CLEVELAND, OHIO.

SHOCK ABSORBER.

Application filed August 16, 1923. Serial No. 657,712.

This invention relates to shock absorbers, particularly those which are mounted intermediate the end of a spring section and a vehicle frame and which employ a fluid such as air under pressure for a cushioning medium.

An object of my invention, is the provision of a shock absorber which is exceedingly simple in construction, and readily adapted for attachment to motor vehicles of relatively light as well as relatively heavy weight.

A further object of my invention is to construct a shock absorber which may be conveniently repaired in the event of defective parts without necessitating considerable loss of time, and in addition rendering the vehicle inoperative.

In carrying out the above objects, I employ a casing in the form of a cylinder, which is arranged to be attached to the vehicle frame and to receive a plunger which is attached to a spring section. The cushioning medium comprises fluid under pressure, such as air which is held within an elastic container. The container is disposed within the casing above the plunger and is provided with a valve for permitting inflation from a point outside the casing. The container is inflated until the force acting upwardly on the plunger is counter-balanced, in which position the walls of the container are extended. When the plunger moves upwardly due to the vehicle wheels passing over obstructions in the road-way, then the fluid within the container is compressed while the normally extended walls of the container contract longitudinally, wherefore the material of which the container is made cannot be pinched between the plunger and casing.

The means for carrying out the above objects is illustrated in the preferred form in the drawing and is more fully set forth in the following description. The essential characteristics are summarized in the claim.

In the drawing, Fig. 1 is a side elevation showing a portion of an automobile adjacent the rear end thereof and illustrating a shock absorber made in accordance with my invention; Fig. 2 is a vertical section on an enlarged scale through the shock absorber. Fig. 3 is a detail showing in horizontal section the connection of the shock absorber to the vehicle spring.

My invention is particularly adapted for use on a motor vehicle and accordingly I have illustrated a vehicle 10 as having a frame 11, a spring section 12 and a wheel 13. The shock absorber is adapted to comprise the connection between the frame and spring and accordingly I have illustrated the relatively stationary member or casing 15 as being attached to the frame, and the relatively movable member or plunger 16 as being carried by the spring section. The pressure exerted by the spring upon the plunger is counter-balanced by the pressure of a compressible fluid within the casing.

The relatively stationary member 15 is shown as a cylinder having a closure 17 at one end thereof, which is adapted to be removably attached thereto and to support a dust cap 18. The lower end of the casing is preferably open to receive a plunger or piston 16 which is vertically movable within the casing and is arranged to be attached to the spring section.

The casing is preferably provided with an enlargement 20 terminating in a pair of spaced eyes 21 which embrace the end of the frame member and are secured to it by a pin 22. A brace 23 is secured to the casing preferably by having a threaded end portion 25 screwing into a threaded opening 24 in the enlargement and locked thereto by a jam nut 26. The lower end of the brace may also be threaded to receive adjusting nuts 27 and 28 on opposite sides respectively of the frame 11. Suitable wedge-shaped members 29 may be employed for providing even bearing surface for the adjusting nuts. The frame member and rod together with the intermediate portion of the casing, provide a triangular support rigidly holding the casing in proper position, wherefore the casing is prevented from swinging through the spring section and moves longitudinally with relation to the frame.

The lower end of the plunger 16 is shown as provided with a lateral extension 30 in the form of two spaced ears adapted to stand on opposite sides of the spring eye. These ears have rectangular openings 33 and within these openings are rectangular blocks 34 which align with the spring eye and are occupied by the bolt 36 passing through the blocks and eye. By this arrangement the lower end of the plunger may be readily attached to the spring section without necessitating the cutting of any portion of the spring. When attached, the shock absorber is not affected by longitudinal movement of the spring with relation to the frame.

The flexible container 40 is preferably a hollow rubber bag which is adapted to be inserted within the casing above the plunger and is equipped with an air valve, indicated generally at 41, which projects through the closure 17. The upper end of this container is preferably dome-shaped and engages the complementarily shaped inner wall of the closure. The lower end of the container bears against a disk 42 of suitable material as for instance raw-hide, which rests on the plunger and forms a seat for the container, and by having a snug engagement with the casing, prevents pinching of the container.

The air valve 41 of the container is of such size as to permit the attachment of the head of an ordinary air hose or tire pump. The removable closure 17 permits the ready replacement of defective containers, whenever necessary.

Assuming that a shock absorber constructed in accordance with my invention is attached to a motor vehicle and that the flexible chamber 40 is inflated sufficiently to support the load of the vehicle, then under normal conditions, the walls of the container are stretched. Accordingly, as soon as the plunger is moved upwardly, the fluid within the container is compressed while the walls of the distended container contract thus avoiding the tendency of the walls to pucker or to be damaged by being forced between the plunger and the walls of the casing.

In view of the foregoing description, it will be understood that I have provided a very simple shock absorber which has the advantages obtained by the employment of a fluid under pressure for a cushioning medium and which avoids the disadvantages incident to the packing of such shock absorbers to prevent leakage of the fluid around the plunger. A further advantage of a shock absorber constructed in accordance with my invention is the adaptability for attachment to existing vehicles, and the capability of use on vehicles of relatively light construction.

I claim:—

The combination with a vehicle frame and a spring section associated therewith and terminating in an eye, a casing rigidly mounted on the frame, a plunger movable within the casing and having rigid therewith slotted ears on opposite sides of the section eye, blocks slidable in such slots, a pin occupying the blocks and eye, an elastic container within the casing and adapted when inflated to oppose the movement of the plunger.

In testimony whereof, I hereunto affix my signature.

JOSEPH HOFFMAN.